US012810440B2

(12) United States Patent
Orosz et al.

(10) Patent No.: US 12,810,440 B2
(45) Date of Patent: Nov. 24, 2026

(54) VEHICLE KINEMATIC DATA EXTRACTION USING UNMANNED AERIAL VEHICLES

(71) Applicant: The Regents of The University of Michigan, Ann Arbor, MI (US)

(72) Inventors: Gabor Orosz, Ann Arbor, MI (US); Tian Mi, Ann Arbor, MI (US); Denes Takacs, Budapest (HU); Henry Liu, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 266 days.

(21) Appl. No.: 18/664,894

(22) Filed: May 15, 2024

(65) Prior Publication Data

US 2024/0386580 A1 Nov. 21, 2024

Related U.S. Application Data

(60) Provisional application No. 63/466,755, filed on May 16, 2023.

(51) Int. Cl.
*G06T 7/215* (2017.01)
*G06T 7/70* (2017.01)
(Continued)

(52) U.S. Cl.
CPC ................ *G06T 7/215* (2017.01); *G06T 7/70* (2017.01); *G06V 20/17* (2022.01); *G06V 20/54* (2022.01);
(Continued)

(58) Field of Classification Search
CPC . G06T 7/215; G06T 7/70; G06T 2207/10016; G06T 2207/10032;
(Continued)

(56) References Cited

U.S. PATENT DOCUMENTS

| | | | |
|---|---|---|---|
| 10,571,561 | B2 | 2/2020 | Zorea et al. |
| 11,094,191 | B2 | 8/2021 | Iuzifovich et al. |

(Continued)

FOREIGN PATENT DOCUMENTS

| | | | |
|---|---|---|---|
| BG | 3325 | U1 | 11/2019 |
| CN | 110322701 | B | 4/2020 |

(Continued)

OTHER PUBLICATIONS

Gosta Granlund t al., "WITAS: An Intelligent Autonomous Aircraft Using Active Vision", Jun. 14, 2000.

(Continued)

*Primary Examiner* — Mia M Thomas
(74) *Attorney, Agent, or Firm* — Harness, Dickey & Pierce, P.L.C.

(57) ABSTRACT

An algorithm is presented to extract kinematic variables of ground vehicles and to generate labelled data sets for machine learning algorithms from the unmanned aerial vehicle (UAV) footage. Differently from the existing studies on vehicle detection and tracking, the output kinematic variables include not only position and speed, but also yaw angle and yaw rate, etc. In an intelligent transportation system, these parameters can be used on the planning and control of smart intersections and connected automated vehicles (CAVs). Compared to the GPS device, the proposed techniques provide smoother data and richer dynamics of the vehicles. The algorithm also generates oriented bounding boxes from the drone view (top view) images, and these bounding boxes are converted to the perspective of a fixed camera (roadside view) using homography. The kinematic data and the bounding boxes can serve as the ground truth for machine learning algorithms.

12 Claims, 11 Drawing Sheets

(51) Int. Cl.
*G06V 20/17* (2022.01)
*G06V 20/54* (2022.01)

(52) U.S. Cl.
CPC ............... *G06T 2207/10016* (2013.01); *G06T 2207/10032* (2013.01); *G06T 2207/20081* (2013.01); *G06T 2207/30232* (2013.01); *G06T 2207/30236* (2013.01); *G06V 2201/08* (2022.01)

(58) Field of Classification Search
CPC . G06T 2207/20081; G06T 2207/30232; G06T 2207/30236; G06T 7/246; G06V 20/17; G06V 20/54; G06V 2201/08
See application file for complete search history.

(56) References Cited

U.S. PATENT DOCUMENTS

| | | | | |
|---|---|---|---|---|
| 11,461,912 | B2 * | 10/2022 | Matthies | B64U 10/14 |
| 2015/0078654 | A1 * | 3/2015 | Chaudhury | G06V 20/46 382/159 |
| 2018/0257770 | A1 * | 9/2018 | Kubik | B64C 27/57 |
| 2019/0030371 | A1 * | 1/2019 | Han | A61N 5/103 |
| 2019/0057588 | A1 * | 2/2019 | Savvides | G06V 20/52 |
| 2019/0154871 | A1 * | 5/2019 | Leduc | G08B 13/1895 |
| 2019/0339082 | A1 | 11/2019 | Doig et al. | |
| 2020/0020093 | A1 * | 1/2020 | Frei | G06T 7/74 |
| 2020/0152057 | A1 | 5/2020 | Roy | |
| 2021/0326640 | A1 * | 10/2021 | Wang | G06F 18/22 |
| 2022/0366569 | A1 * | 11/2022 | Gao | H04N 5/2625 |
| 2022/0390237 | A1 * | 12/2022 | Elgersma | G06F 18/2321 |
| 2023/0053785 | A1 * | 2/2023 | Carvalho | B60W 60/001 |
| 2023/0057509 | A1 * | 2/2023 | Emmons | G06V 10/82 |
| 2023/0195970 | A1 * | 6/2023 | Symington | G06F 30/27 703/8 |
| 2023/0242118 | A1 * | 8/2023 | Orosz | B60W 10/04 701/24 |
| 2024/0017731 | A1 * | 1/2024 | Fasola | G07C 5/008 |
| 2024/0062556 | A1 * | 2/2024 | Cho | G06V 20/588 |
| 2024/0074428 | A1 * | 3/2024 | Mccann | A01M 21/043 |
| 2024/0290088 | A1 * | 8/2024 | Roy | B64U 10/13 |
| 2025/0285315 | A1 * | 9/2025 | Singh | G06V 20/13 |
| 2026/0065685 | A1 * | 3/2026 | Orosz | G06V 20/54 |

FOREIGN PATENT DOCUMENTS

| | | | |
|---|---|---|---|
| CN | 112074790 | A | 12/2020 |
| CN | 109598938 | B | 1/2021 |
| CN | 112489417 | A | 3/2021 |
| CN | 114418468 | B | 7/2022 |
| CN | 114911253 | A | 8/2022 |
| KR | 102007140 | B1 | 8/2019 |
| KR | 20190095909 | A | 8/2019 |
| KR | 102226067 | B1 | 3/2021 |
| WO | 2017211136 | A1 | 12/2017 |
| WO | 2018072240 | A1 | 4/2018 |
| ZA | 201907923 | B | 11/2020 |

OTHER PUBLICATIONS

"Gao Hang et al., ""Automatic Extraction of Multi-Vehicle Trajectory Based on Traffic Videotaping From Quadcopter Model"", Applied Mechanics and Materials vol. 552, Jun. 30, 2014."

Peter Reinartz et al., "Traffic monitoring with serial images from airborne cameras", ISPRS Journal of Photogrammetry & Remote Sensing 61 (2006) 149-158, Nov. 13, 2006.

Joyoung Lee et al., "Examining the Applicability of Small Quadcopter Drone for Traffic Surveillance and Roadway Incident Monitoring", Jan. 2015.

"Giuseppe Salvo at al., ""Traffic data acquirement by unmanned aerial vehicle"", European Journal of Remote Sensing, 50:1, 343-351, DOI: 10.1080/22797254.2017.1328978, Jun. 1, 2017."

"Emmanouil N. Barmpounakis, Eleni I. Vlahogianni, John C. Golias & Adam Babinec (2019) How accurate are small drones for measuring microscopic traffic parameters?, Transportation Letters, 11:6, 332-340, DOI: 10.1080/19427867.2017.1354433, Jul. 13, 2017."

* cited by examiner

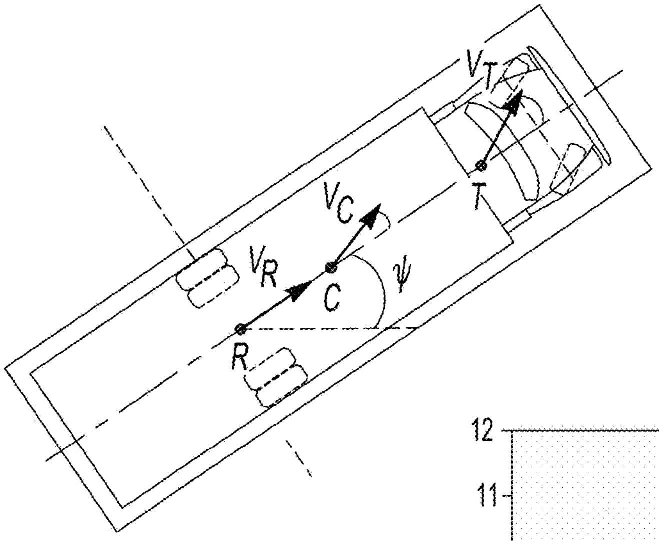
FIG. 4
FIG. 5A
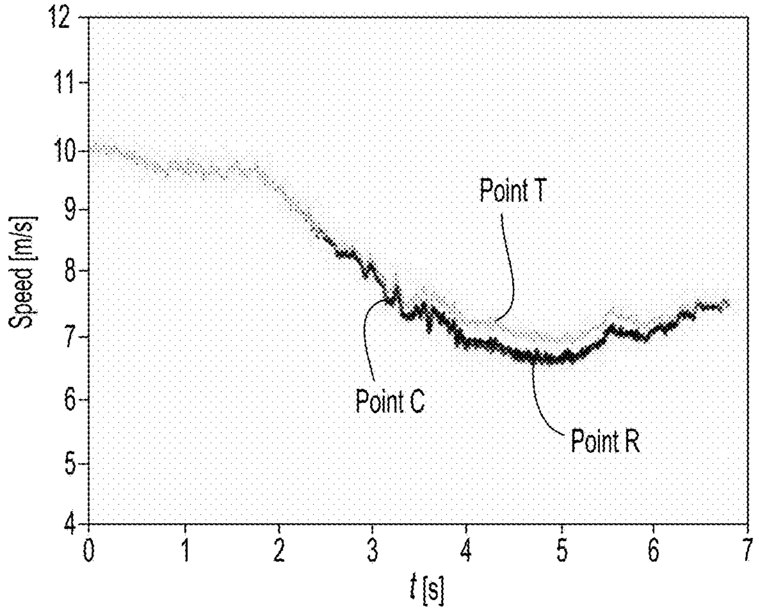
FIG. 5B
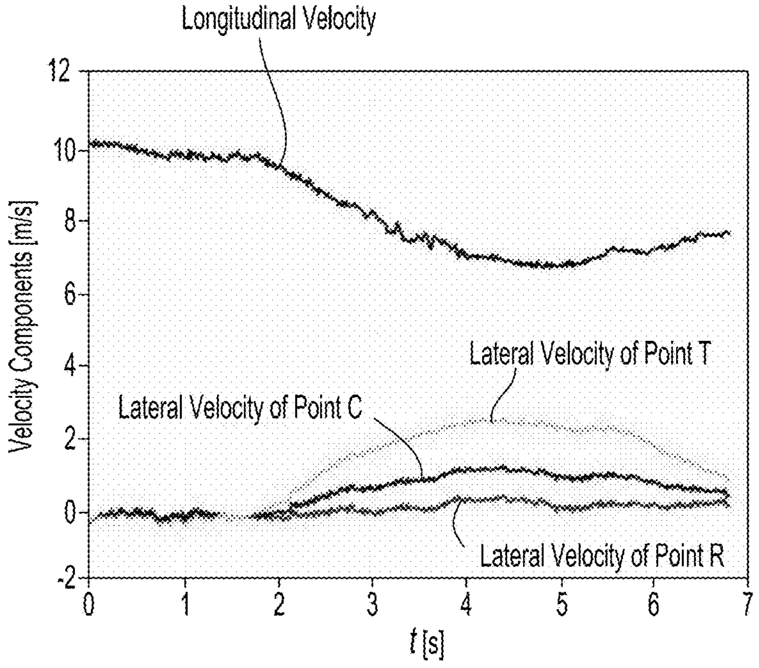

VEHICLE KINEMATIC DATA EXTRACTION USING UNMANNED AERIAL VEHICLES

CROSS-REFERENCE TO RELATED APPLICATIONS

This application claims the benefit and priority of U.S. Provisional Application No. 63/466,755 filed on May 16, 2023. The entire disclosure of the above application is incorporated herein by reference.

FIELD

The present disclosure relates to techniques for extracting kinematic variables of ground vehicles and generating labelled data sets for machine learning algorithms from images taken by an unmanned aerial vehicle (UAV).

BACKGROUND

Unmanned aerial vehicles (UAVs), also referred as drones, have attracted increasing attention of researchers in traffic monitoring and management due to their mobility and low cost. Instead of fixed-location sensors, such as cameras, radars, and loop detectors installed at the infrastructure, which can only collect data from a specific perspective or location and often result in inaccurate and/or aggregated data, UAVs with onboard sensors serve as mobile sensors in modern traffic networks, and can be used to track individual vehicles accurately. UAVs can even be coordinated to collect large scale traffic information to monitor traffic and study congestion. While there are different types of sensors UAVs can carry, such as video cameras, thermal cameras, infrared cameras, LIDAR, and radar, high-resolution video cameras are one of the most popular sensors for traffic monitoring. This is very cost effective compared to collecting vehicle data via probe vehicles equipped with high-precision GPS, which is costly and only allows the collection of a few vehicle trajectories.

Current research has focused on using UAV obtained videos for vehicle detection, classification, and tracking, in order to monitor and analyze traffic, study traffic flow, and calibrate traffic simulation, etc. The data obtained are typically vehicle types and counts, vehicle positions, vehicle speeds, and flow speeds. In these scenarios, vehicles are treated as points from the vehicle dynamics perspective, since the orientation is ignored.

In the coming era of connected and automated vehicles and intelligent transportation systems, knowing the dynamics of the ego vehicle and surrounding vehicles are crucial for the vehicle controller design, and for providing a safer environment for all road users. Instead of on-board sensors of limited range and fixed-location sensors with inaccurate and/or aggregated data, an UAV is used to extract kinematic variables for ground vehicle in this disclosure.

This section provides background information related to the present disclosure which is not necessarily prior art.

SUMMARY

This section provides a general summary of the disclosure, and is not a comprehensive disclosure of its full scope or all of its features.

In one aspect, a method is presented for extracting kinematic data for vehicles using an unmanned aerial vehicle. The method incudes: defining a region of interest on the ground; providing a background image of the region of interest; capturing, by a camera, a series of images over time of the region of interest from a perspective above the region of interest; from the series of images, detecting at least one vehicle moving in the region of interest; for each image in the series of images, fitting a bounding box to the at least one moving vehicle, where the bounding box surrounds the at least one moving vehicle and the size of the bounding box is same across the series of images; and determining kinematic data for the at least one moving vehicle using the bounding boxes, where the kinematic data includes yaw angle for the at least one moving vehicle.

In another aspect, a method is presented for detecting a vehicle passing through a region of interest. The method includes: capturing, by a top view camera, a first set of images of a region of interest on the ground from a perspective above the region of interest; from the first set of images, creating a plurality of bounding boxes for each vehicle moving in the region of interest, and extracting kinematic data for each vehicle moving in the region of interest using the plurality of bounding boxes; capturing, by a side view camera, a second set of images of the region of interest from a perspective on side of the region of interest; projecting the plurality of bounding boxes to viewpoint of the side view camera; and training a machine learning algorithm to detect moving vehicles in images captured by the side view camera, where the machine learning algorithm is trained using the second set of images and a ground truth, and the kinematic data and the plurality of bounding boxes projected to the viewpoint of the side view camera the serves as the ground truth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a diagram of a bicycle mode applied to a truck.

FIGS. 5A-5C are graphs showing speed, velocity components, and heading angles and yaw angle of a truck over time, respectively.

Corresponding reference numerals indicate corresponding parts throughout the several views of the drawings.

DETAILED DESCRIPTION

Example embodiments will now be described more fully with reference to the accompanying drawings.

Figure 1:
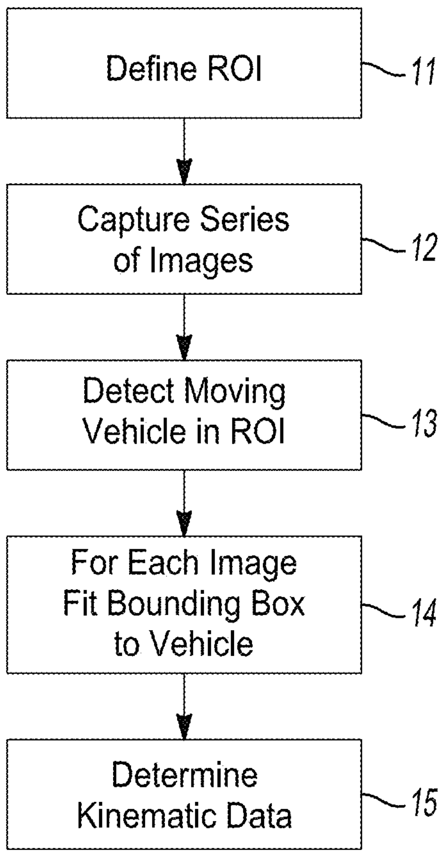
FIG. 1 is a flowchart depicting a method for extracting kinematic data for a vehicle from image data.
Figure 2:
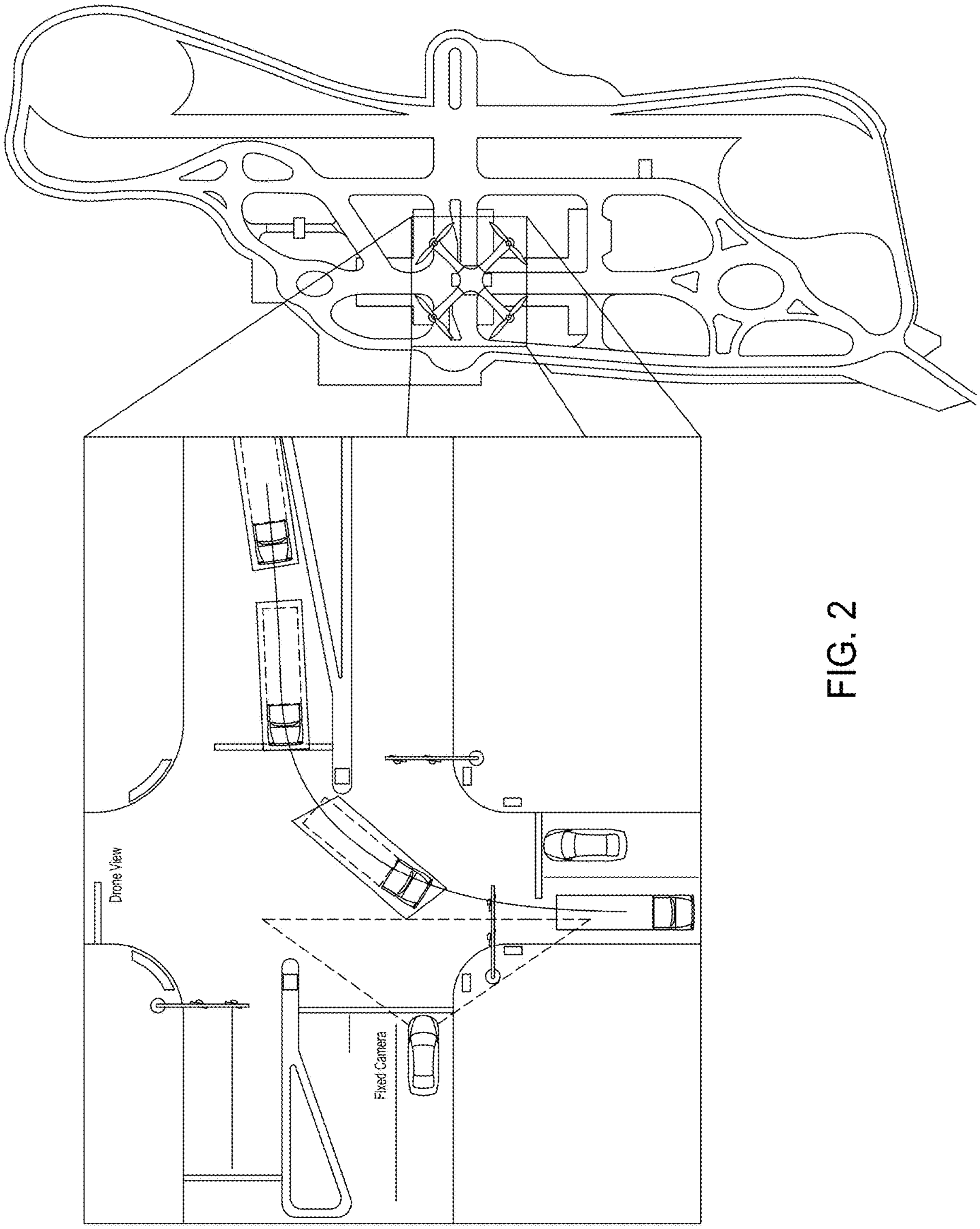
FIG. 2 is a diagram of an example intersection at a test facility.

In one aspect, a method is presented for extracting kinematic data for vehicles as depicted in FIG. 1. As a starting point, a region of interest (ROI) is defined as indicated at 11. For demonstration purposes, an experiment was carried out in Mcity Test Facility at the University of Michigan, Ann Arbor. As shown in FIG. 2, the intersection of State Street (north-south) and Main Street (east-west) was chosen for the experiment and designated the region of interest. The experiment is designed as follows. A 26-ft moving truck (Ford F-650) moves towards the intersection from the westbound of Main Street, then makes a left turn to State Street, while a stationary personal vehicle stays at the eastbound of the intersection with its camera facing forward. The truck has an onboard GPS of 10 Hz frequency installed on top of the cabin. There are three other vehicles parked at the intersection to imitate a real environment. A DJI Phantom 4 Pro drone equipped with a video camera of the highest performance of 60 frames per second (fps) is sent above the intersection, of about 250 feet high. The camera is facing down to the intersection in order to record the movements of the vehicles. The effective pixels of the camera is 20M, and it has a 3-axis gimbal for stabilization. The movement of the truck is captured by both the drone camera (top view) and the stationary vehicle's camera (side view).

Figure 3A:
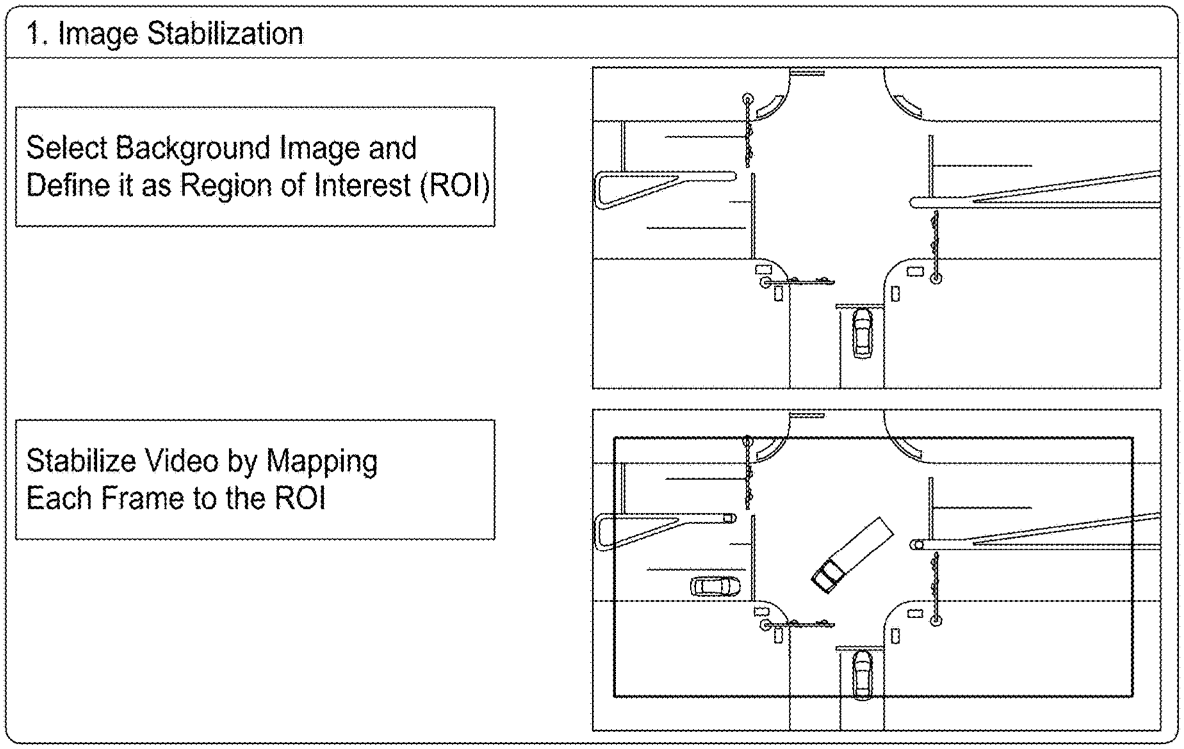
FIG. 3A shows image stabilization techniques in accordance with this disclosure.

A series of images (i.e., a video) are captured over time by a camera at 12, where each image is of the region of interest from a perspective above the region of interest. For example, the series of images may be captured using an unmanned aerial vehicle, where the unmanned aerial vehicle is equipped with the camera. Prior to object detection, image stabilization is performed as shown in FIG. 3A. In particular, a background image of the intersection is selected from the series of images when the target vehicles are not present, and it is defined as the region of interest (ROI) to map each frame of the video. The use of the background image not only reduces the computation time by eliminating the unnecessary part of the images, but also stabilizes the video obtained from the hovering drone.

Figure 3B:
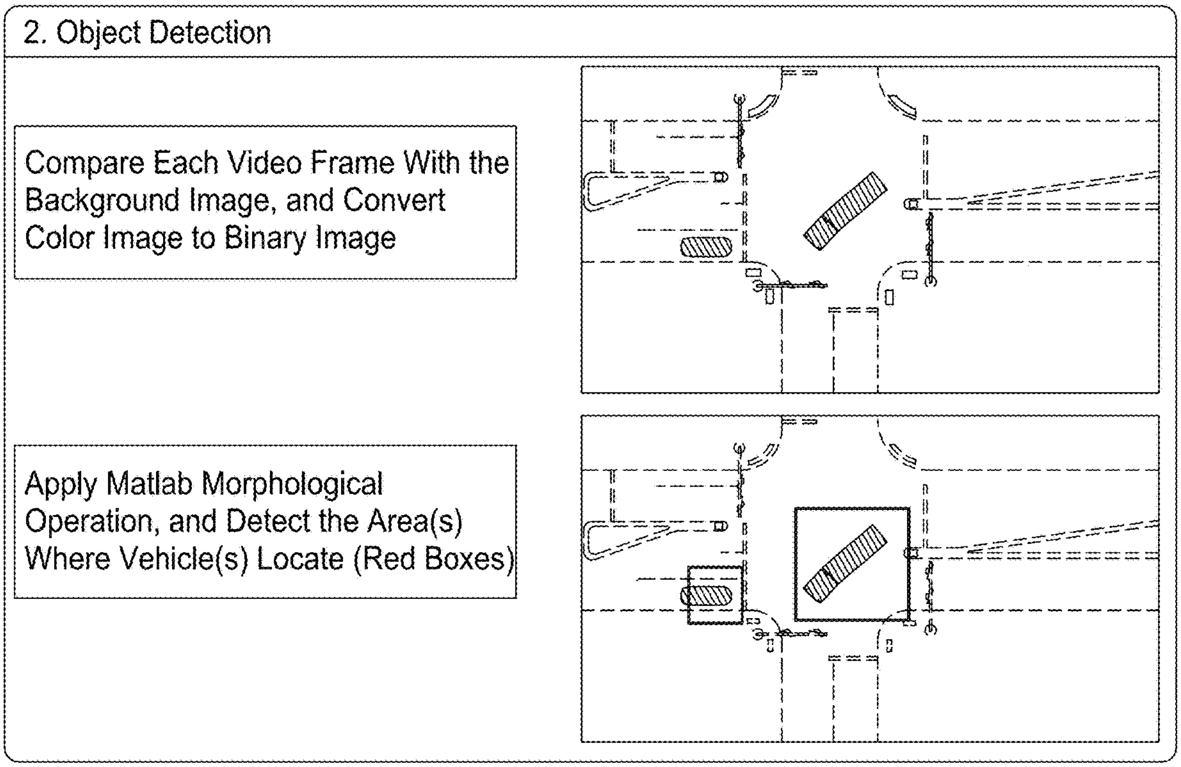
FIG. 3B shows an object detection technique in accordance with this disclosure.

From the series of images, at least one vehicle moving in the region of interest is detected at 13. Moving objects can be detected by comparing each frame in the series of images with the background image as shown in FIG. 3B. The comparison results in a binary image. In an example embodiment, morphological operations are applied to eliminate the small changes of the image (due to shadows, moving leaves in the wind, and slight changes of camera perspective, etc.) and to merge the neighboring patches which belong to the same object. The outcomes of this step are the detection boxes (marked as red squares in FIG. 3B), and the number of objects. Note that the detection boxes are square-shaped considering the orientations of the vehicles, and they can be in different sizes according to the actual vehicle sizes. The goal of this step is to find the rough locations of the vehicles and to prepare for the precise vehicle detection. On the one hand, the parked vehicles in the background are not detected. On the other hand, as long as the vehicle is not in the background image, even if it is parked, it can still be detected. The background image can be updated to accommodate larger changes during the day (or different times of the year), but this is not needed in this research since the time of interest is less than a minute. These steps may be implemented using Matlab or other commercially available image processing tools.

Figure 3C:
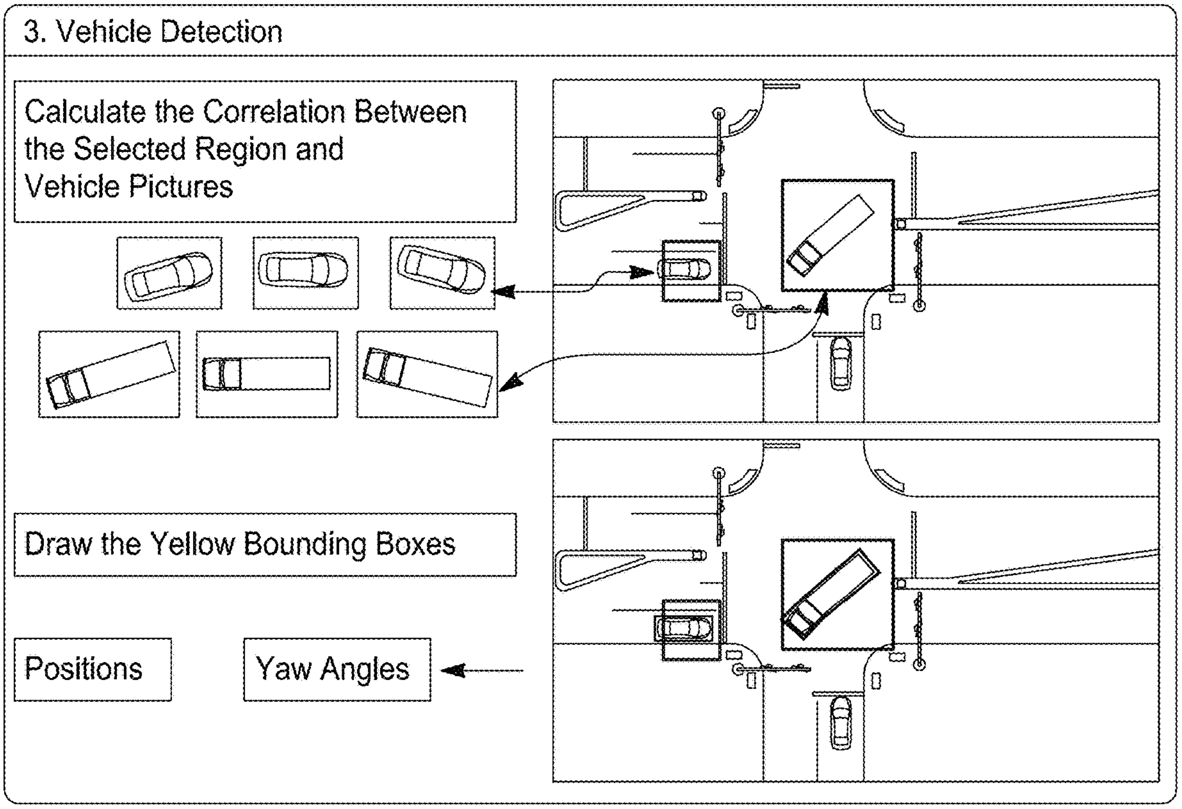
FIG. 3C shows a vehicle detection technique in accordance with this disclosure.
Figure 3D:
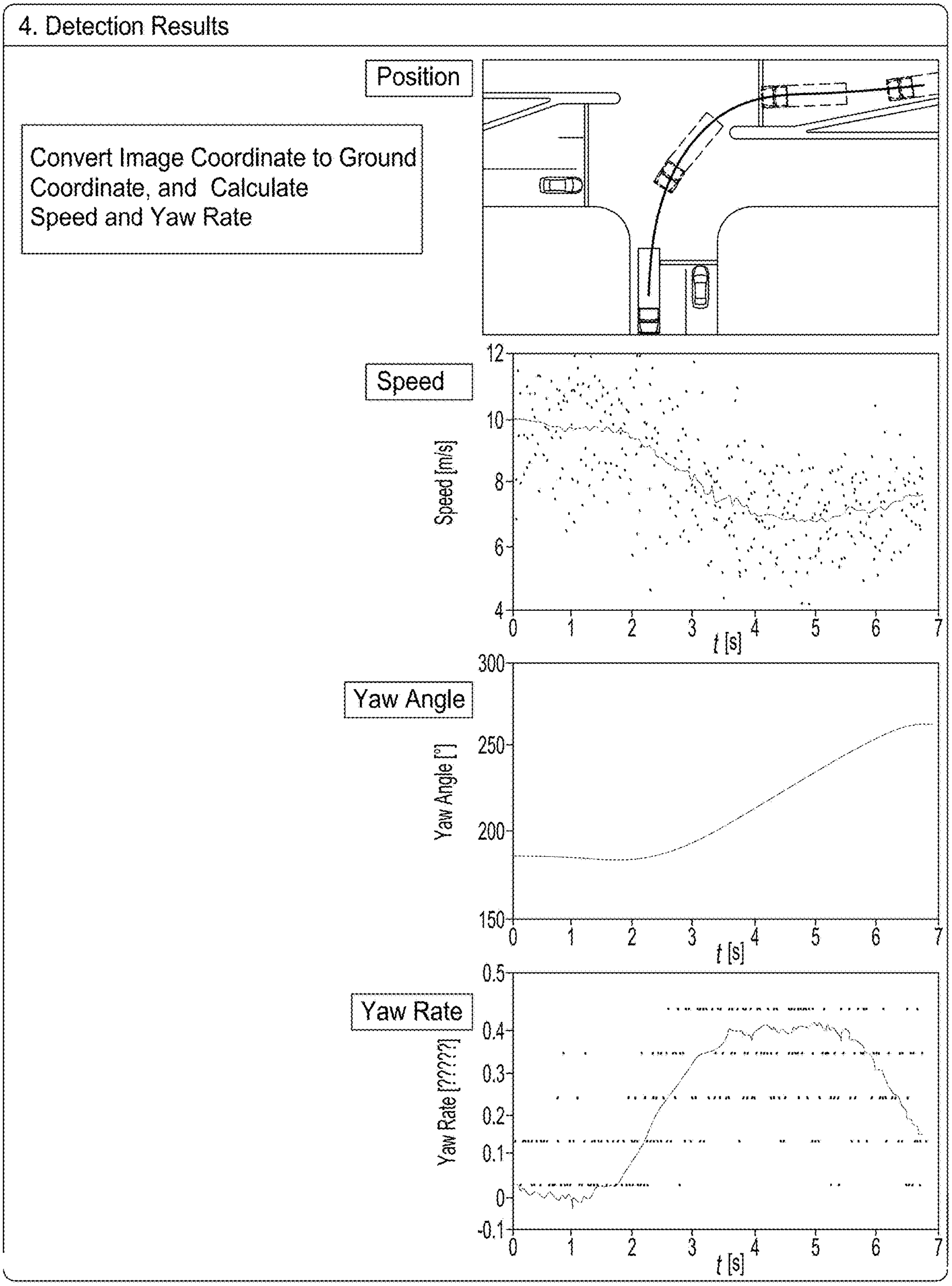
FIG. 3D shows kinematic data extracted from images in accordance with this disclosure.

For each image in the series of images, a bounding box is fit at 14 to each of the detected moving objects. With reference to FIG. 3C, a detection box surrounds the detected moving object. More specifically, fitting the bounding box to a detected moving object includes overlay a pre-defined image of the objection (e.g., a car or a truck) on the detection box; changing orientation of the pre-defined image in relation to the detected moving object; for each orientation, determining a correlation metric between the pre-defined image and the periphery of the detected moving object; and drawing a bounding box around the detected moving object based on the pre-defined image having the correlation metric with highest value. It is noted that the size of the bounding box is the same across a series of images.

Finally, kinematic data for the moving objects can be determined at 15 using the bonding boxes. The position and the yaw angle of a moving object can be obtained directly from the bounding box as described below. Taking a truck as an example, apply the bicycle model to the truck as shown in FIG. 4, where Point C is the geometric center of the bounding box, point T is on top of the cabin where the GPS antenna is installed, and point R is the center of the real axle. $v_T$, $v_C$, and $v_R$ are the velocities at points T, C, and R, respectively, while $\beta_T$, $\beta_C$, and $\beta_R$ are the angles between the velocities and the vehicle longitudinal direction. $\psi$ is the yaw angle of the truck, i.e., the orientation of the truck measured in relation to a fixed reference axis in ground coordinate system. Note that the heading angle $\theta$ is given by the sum of yaw angle $\psi$ and angle $\beta$. For example, the heading angle $\theta_C$ at point C is $(\psi+\beta_C)$. Assuming no side slip for the rear wheel, that is, the velocity at point R is aligned with the vehicle and it only has longitudinal component, $\beta_R \approx 0$.

Consider the vehicle as a rigid body, the yaw rate is the same at any point of the body, but the velocity and heading angle are different at different points. The position $$r_c = \begin{bmatrix} x_C \\ y_C \end{bmatrix}$$

of point C and the yaw angle $\psi$ can be directly obtained from the bounding box after converting the image coordinate to a ground coordinate. With the distances measured between point T and center point C is $d_{CT}$=3.49 m, and between center point C and rear axle center point R is $d_{CR}$=2.21 m, the positions of point T and point C can be calculated as:

$$r_T = \begin{bmatrix} x_T \\ y_T \end{bmatrix} = \begin{bmatrix} x_C \\ y_C \end{bmatrix} + d_{CT}\begin{bmatrix} \cos\psi \\ \sin\psi \end{bmatrix},\ r_R = \begin{bmatrix} x_R \\ y_R \end{bmatrix} = \begin{bmatrix} x_C \\ y_C \end{bmatrix} - d_{CR}\begin{bmatrix} \cos\psi \\ \sin\psi \end{bmatrix}. \quad (1)$$

Knowing the position information at each time step, one can estimate the velocity $v_C$ and its magnitude, the speed $v_C$ using distance traveled divided by the time difference between consecutive frames:

$$v_c = \begin{bmatrix} \Delta x_C/\Delta t \\ \Delta y_C/\Delta t \end{bmatrix}, v_c = \frac{\Delta rc}{\Delta t}, \tag{2}$$

where $\Delta x_C$ and $\Delta y_C$ are the changes of the x and y coordinates between frames and $$\Delta r_c = \sqrt{\Delta x_C^2 + \Delta y_C^2}.$$

That is, the speed of the center point of the bounding box, is calculated by determining the distance between center points of two consecutive bounding boxes and dividing the distance by the time different between consecutive frames. The velocity and the speed of the points T and R can be determined similarly. A direct division, however, can cause large errors. One pixel from the image is about 0.0275 m in reality, and the time difference is $\Delta t = 1/60$ s (with a frame rate of 60 fps). In this case, even an error of one pixel can lead to $0.0275 \times 60 = 1.65$ m/s when estimating the speed. Thus, the direct speed calculation is smoothed in the plots. FIG. 5A shows the smoothed speed curve at each point of the vehicle using 21 data points, which is corresponding to 1/3 s (1/6 s ahead and 1/6 s behind). Instead of the two-sided smoothing, one-sided smoothing which only uses the past information can also be adapted to apply the algorithm online. In the beginning of a trip, for about 2 seconds when the vehicle is moving straight to the intersection, the speed at the three points (T, C and R) are very close. However, when the vehicle starts to turn, the difference becomes obvious, and point T at the front of the vehicle has the largest speed. This is clearly shown in FIG. 5B, where the black curve is the longitudinal velocity and the green, blue, red curves are the lateral velocities of point T, C, and R, respectively. The longitudinal velocity is aligned with the vehicle orientation, and all three points have the same longitudinal velocity since the vehicle is considered as a rigid body and the bounding box is in fixed length. The lateral velocity is perpendicular to the longitudinal velocity. In the beginning two seconds, the lateral velocities are approximately zero at all three points, and when the turn starts, the lateral velocities at point T and C increase to different magnitudes while remains close to zero at point R. This shows that there is only small side slip at the rear wheels, and validates the assumption of the bicycle model.

Figure 5C:
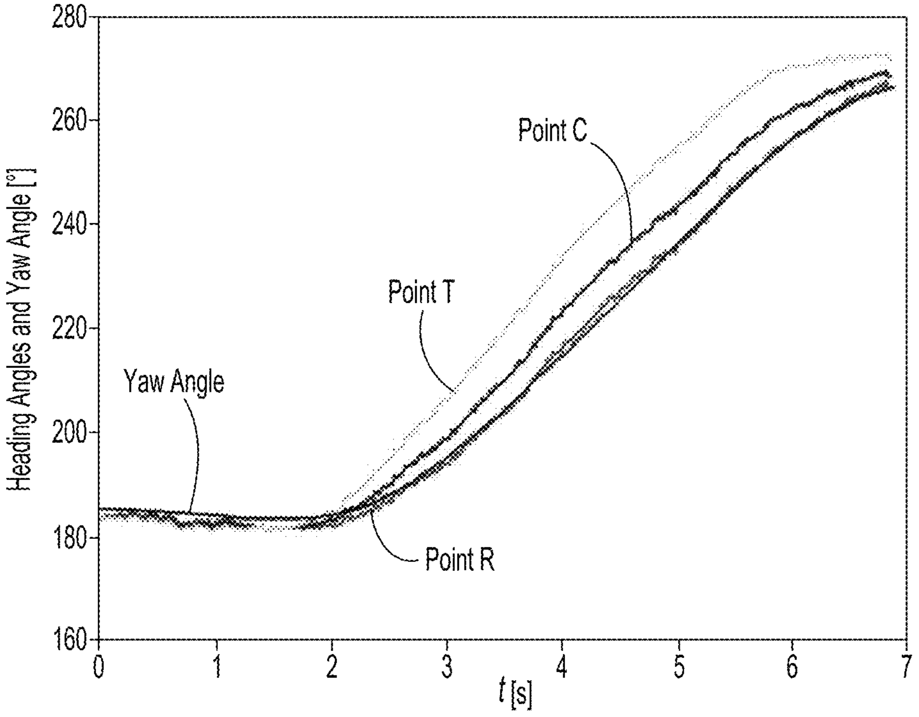

The yaw rate, $$\omega = \frac{\Delta\psi}{\Delta t},$$

can be calculated in the similar way using the yaw angle of the vehicle. The smoothed curves of speed and yaw rate and their original data (position/yaw angle difference divided by time difference) are plotted in FIG. 3. Here, the heading angle θ is given by the velocity direction, and varies at different points. FIG. 5C gives the heading angles calculated by the velocity directions at point T, C, and R. For comparison, the yaw angle obtained from the bounding box is also plotted in black curve. Point T has the largest heading angle, and the heading angle at point R is very close to the yaw angle ($\beta_R \approx 0$).

Figure 6A:
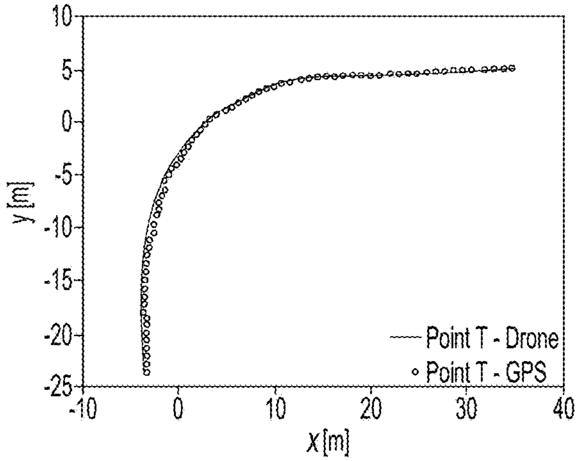
FIGS. 6A-6F are graphs comparing extracted kinematic data with GPS data.
Figure 6B:
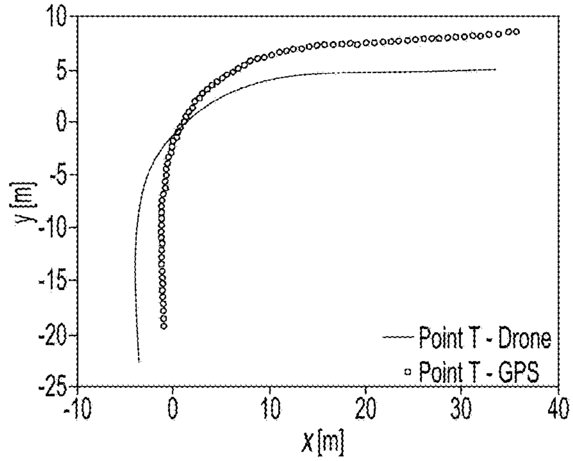
Figure 6C:
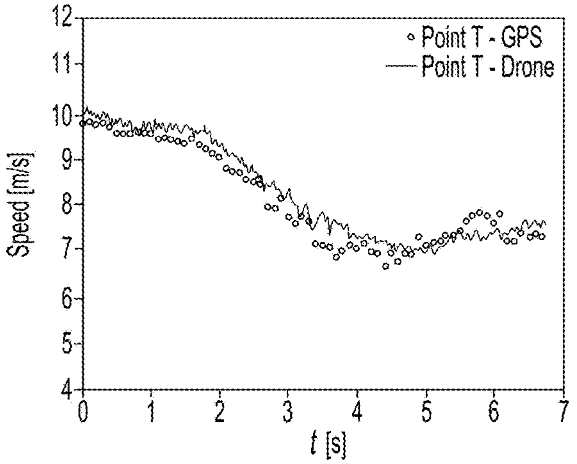
Figure 6D:
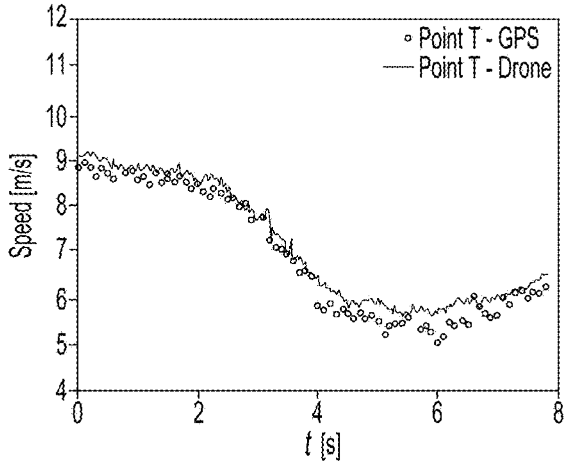
Figure 6E:
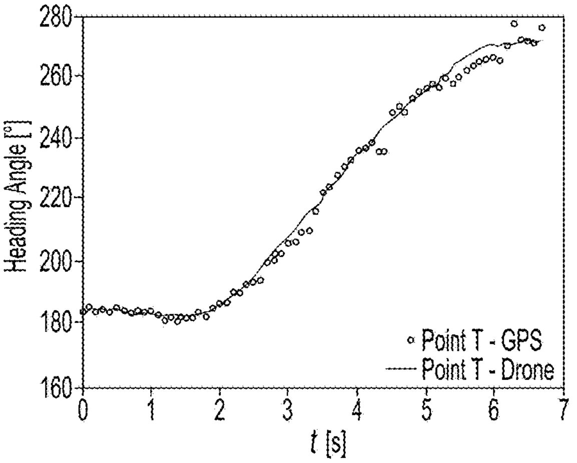
Figure 6F:
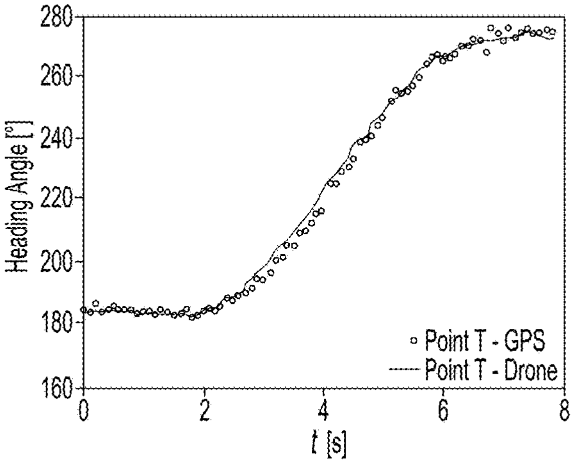

As proof of concept, the detection results from the drone view video (60 Hz) are compared with the GPS data (10 Hz). The GPS antenna is installed at point T of the truck (see FIG. 4), thus the position, speed, and heading angle are all plotted at point T in FIG. 6A-6F, where the solid green curves are obtained from the drone view video and the black circles are from the GPS device. FIGS. 6A, 6C and 6E are from one run of the experiment, while FIGS. 6B, 6D and 6F are from another run. In FIG. 6A, the position points from the video are raw data obtained from the bounding box; while the GPS and the video data have a good fit, the trajectory from the video is smoother. The speed information from the drone view video in FIG. 6C is the same with the green curve in FIG. 5A, which is smoothed with 1/3 s data. The yaw angle can be estimated by the heading angle at the rear axle center (at point R), but cannot be generated from the GPS detection directly (at point T), thus it is hard to compare with the video process result. The heading angle $\theta_T$ from the drone view video is calculated using:

$$\theta_T = \text{artcan}\frac{\Delta y_T}{\Delta x_T}, \tag{3}$$

The curve is smoothed with 1/3 s data points, and is the same with the green curve in FIG. 5C.

For the other run of the experiment, the GPS position in FIG. 6B has more than 4 meters drift. FIG. 6D shows that the vehicle runs slower compared to panel FIG. 6C, with a maximum speed of about 9 m/s, thus it takes longer to finish the turn. The GPS data agree with the video process results in FIGS. 6D and 6F, which also have the similar trend compared to panels FIGS. 6C and 6E.

Despite the drift of GPS data, in general, the drone video process results fit well with the GPS data, while the video process gives smoother data in position and yaw angle (or heading angle) and provides richer information of the vehicle dynamics (heading angles and velocity components at different points, yaw rate) compared to the GPS device which only gives information for a single point.

Figure 7:
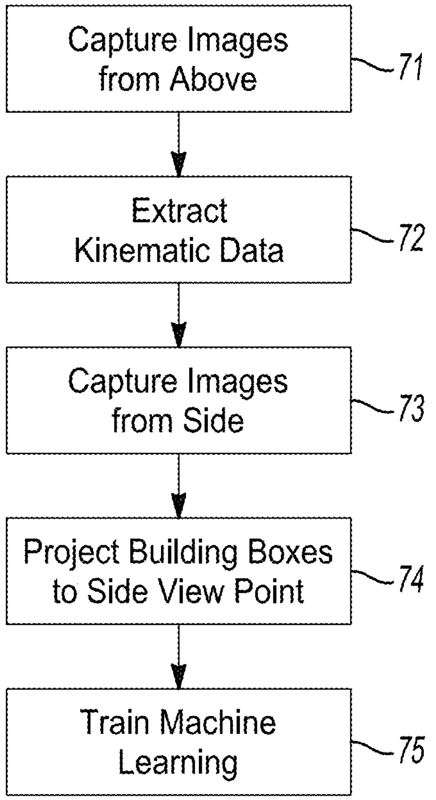
FIG. 7 is a flowchart depicting a method for detecting a vehicle passing through a region of interest.

In another aspect of this disclosure, a method is presented for detecting a vehicle passing through a region of interest as depicted in FIG. 7. Similar to above, a first set of images of a region of interest on the ground is captured at 71 from a perspective above the region of interest. In one example, the first set of images is captured using an unmanned aerial vehicle, where the unmanned aerial vehicle is equipped with a (top view) camera. Other methods for capturing a set of images from a perspective above the region of interest are also contemplated by this disclosure.

From the first set of images, kinematic data for each vehicle moving in the region of interest is extracted at 72. The kinematic data for each vehicle can include one or more of position, yaw angle, velocity and yaw rate. The kinematic data is preferably extracted using bounding boxes in accordance with the techniques described above, where a bounding box surrounds a moving vehicle captured in an image.

Next, a second set of images of the region of interest is captured at 73 from a perspective on side of the region of interest. In one example, the second set of images is captured using a second (side view) camera at a fixed location adjacent to the region of interest.

Image data from the first set of images is then projected at 74 to viewpoint of the second side view camera. Rather than project all of the image data, only the bounding boxes are projected to the viewpoint of the side view camera. In an example embodiment, the bounding boxes are projected to the viewpoint of the side view camera using homography as will further described below.

To detect vehicles passing through the region of interest, a machine learning algorithm, such as YOLO (You Only Look Once) objection detection algorithm, can be trained (or re-trained) at 75 to detect moving vehicle using the second set of images and a ground truth. In this example, the ground truth is formed by the extracted kinematic data and the bounding boxes projected to the viewpoint of the side view camera. In other words, the extracted kinematic data and the bounding boxes projected to the viewpoint of the side view camera serve as a labeled data set for training a machine learning algorithm. Other types of machine learning algorithms, including Convolutional Neural Networks and Recurrent Neural Networks, are contemplated by this disclosure.

Once trained, the machine learning algorithm can be used to detect vehicles passing through the region of interest. To do so, image data from the side view camera can be input to the machine learning algorithm. It is envisioned that the extracted kinematic variables can be used for the management of intelligent infrastructure, and with vehicle-to-everything (V2X) communication. The extracted kinematic variables can also be used for the motion planning of connected automated vehicles (CAVs). Note that the algorithms use UAVs for training data collection, and once the algorithm is trained, only the roadside camera is required to extract the kinematic variables Homography can be used to project a bounding box from the drone view image to fixed camera side view. Instead of a rectangle from the drone view, the bounding box would be quadrilateral in the fixed-camera side view. This mechanism enables an easy way to generate bounding boxes from a side-view camera, and together with the ground truth (position, speed, yaw angle, and yaw rate, etc.), they can be utilized to generate training data (labeled data sets) for machine learning algorithms.

Figure 8:
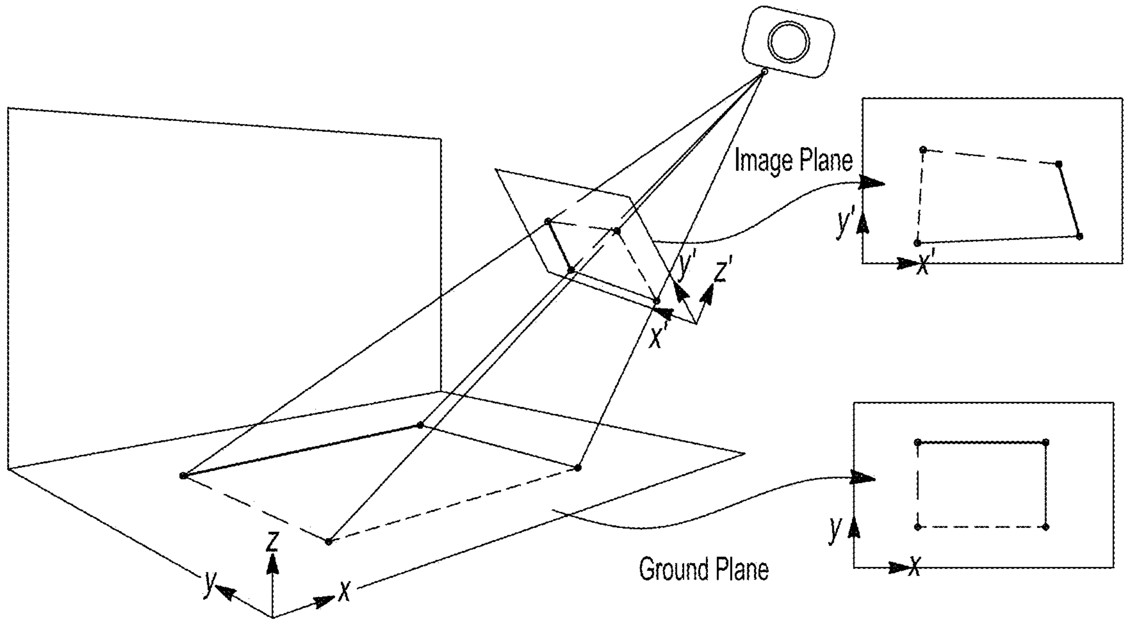
FIG. 8 is a diagram of a rectangle on the ground plane projected as a quadrilateral on the image plane of a camera.

With reference to FIG. 8, a rectangle on the ground plane is deformed from the camera's perspective which is looking down from the side. To convert the coordinate of a general point (x, y) on the ground plane to point (x', y') on the image plane, the matrix H is used as follows:

$$\begin{bmatrix} x' \\ y' \\ 1 \end{bmatrix} = \frac{1}{w} \underbrace{\begin{bmatrix} h_{11} & h_{12} & h_{13} \\ h_{21} & h_{22} & h_{23} \\ h_{31} & h_{32} & h_{33} \end{bmatrix}}_{H} \begin{bmatrix} x \\ y \\ 1 \end{bmatrix} \tag{4}$$

This projection does not consider the distortion of the camera lens, and it preserves the straight lines. Since the scaling factor w doesn't affect the ratio, assuming, for example, $h_{33} \approx 1$ results in eight unknowns in matrix H, thus four points are needed to complete the projection.

Considering a drone about 250 feet above the ground, one can assume the bounding box from the drone view can well represent the bounding box on the ground plane. To map it from the ground plane (drone view) to the fixed-camera plane (i.e., side view), more (than four) points can be selected to reduce the estimation error. The problem is thus converted to finding the matrix H for the best fit projected plane in the fixed-camera side view, which can be solved by the singular value decomposition method. Rewriting the H matrix as:

$$h = [h_{11}, h_{12}, h_{13}, h_{21}, h_{22}, h_{23}, h_{31}, h_{32}, h_{33}]^T. \tag{5}$$

Assume the scale factor w=1, equation (4) becomes $$Ah = 0, \tag{6}$$

where $$A = \begin{bmatrix} x_1 & y_1 & 1 & 0 & 0 & 0 & -x_1x_1' & -y_1x_1' & -x_1' \\ 0 & 0 & 0 & x_1 & y_1 & 1 & -x_1y_1' & -y_1y_1' & -y_1' \\ x_2 & y_2 & 1 & 0 & 0 & 0 & -x_2x_2' & -y_2x_2' & -x_2' \\ 0 & 0 & 0 & x_2 & y_2 & 1 & -x_2y_2' & -y_2y_2' & -y_2' \\ \dots & \dots & \dots & \dots & \dots & \dots & \dots & \dots & \dots \\ x_n & y_n & 1 & 0 & 0 & 0 & -x_nx_n' & -y_nx_n' & -x_n' \\ 0 & 0 & 0 & x_n & y_n & 1 & -x_ny_n' & -y_ny_n' & -y_n' \end{bmatrix}_{2n\times 9} \tag{7}$$

and n is the number of points. Vector h can be obtained by the eigenvector of the least eigenvalue of $A^TA$, which is the direct result of the singular value decomposition of matrix of A.

Figures 9A, 9B:
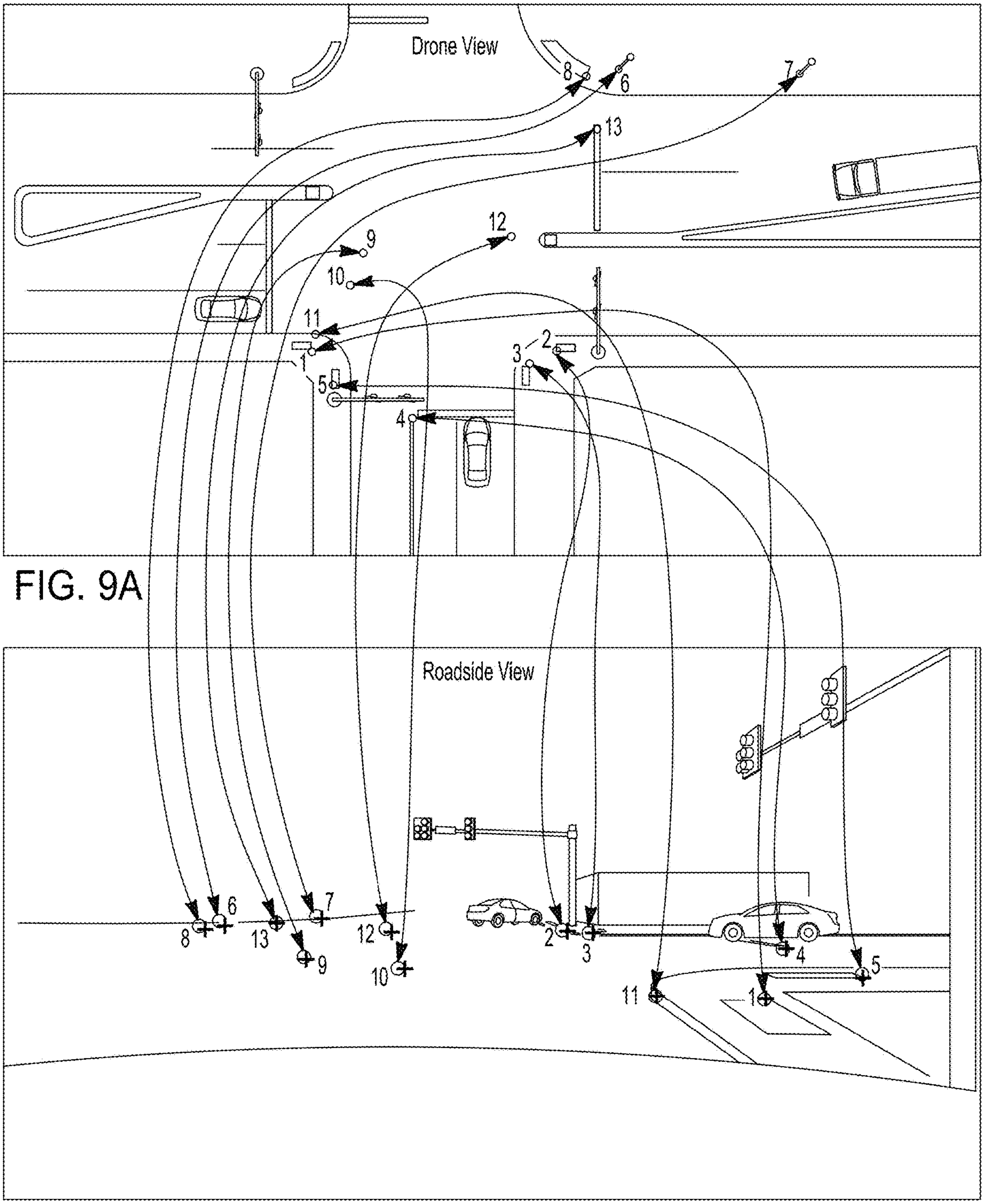
FIGS. 9A and 9B are illustrations showing points selected in drone view (FIG. 9A) in relation to side view (FIG. 9B), where the circles are hand selected points and crosses are calculated from the drone view using matrix H for validation purposes.
Figure 10:
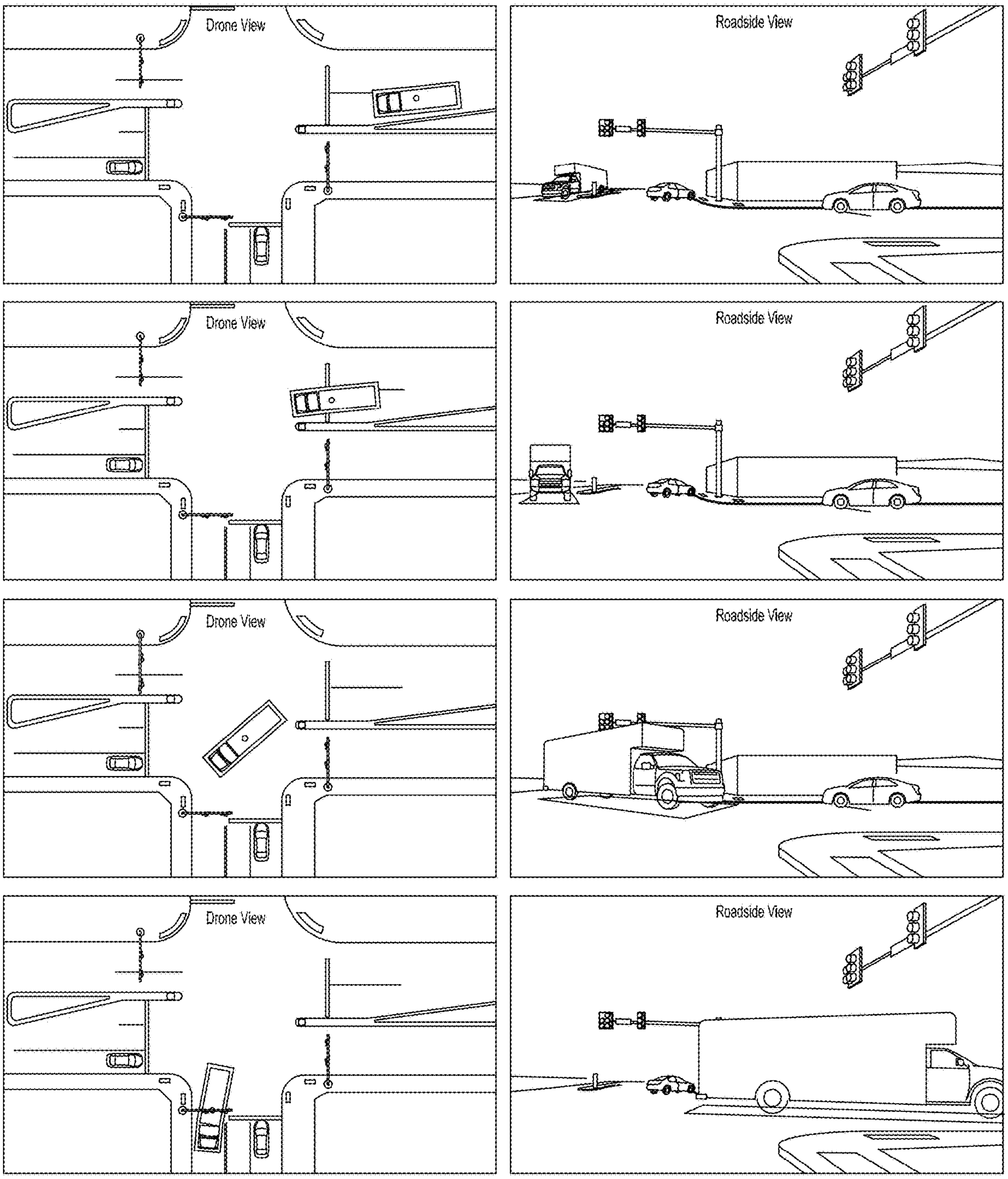
FIG. 10 shows the transfer of bonding box from the drone view to the side view using homography.

As shown in FIGS. 9A and 9B, 13 points are selected (i.e., n=13) from the drone view and the fixed-camera view, marked as yellow circles. The red crosses on the fixed-camera view are the points mapped from the drone view using matrix H, and they are very close to the hand selected points. FIG. 10 shows the bounding box of the truck from the drone view in different positions on the left, and then it is mapped to the image from the fixed camera on the right. Note that the image distortion from the fixed camera is corrected prior to the projection.

Using images from Unmanned Aerial Vehicles (UAVs), an algorithm is developed to track vehicles in an intersection and to generate labelled data sets for machine learning algorithms. Different from previous studies focusing on vehicle detection, classification, and tracking in traffic surveillance, this disclosure uses recorded videos from UAVs to extract and analyze the kinematic variables of vehicles. These variables include position, yaw angle, heading angle, speed, and yaw rate, etc. By comparing each video frame with a background image using Matlab morphological operations, the areas of changes are identified. A finer investigation of these areas are taken to draw the bounding boxes around the vehicles. The position and yaw angle can be read directly from the bounding boxes, while the speed and yaw rate are calculated accordingly.

The extracted kinematic data can be used in the control and planning of smart intersections, especially in the environment with connected automated vehicles (CAVs), since knowing the dynamics of other vehicles can benefit the CAVs for their decision making and path planning as well. With the obtained data and bounding boxes (from side view fixed camera) as the "ground truth", this algorithm can be used to generate training data for machine learning algorithms which can perform more complex tasks, for example, online tracking.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for extracting kinematic data for vehicles using an unmanned aerial vehicle, comprising:
- defining a region of interest on the ground;
- providing a background image of the region of interest;
- capturing, by a camera, a series of images over time of the region of interest from a perspective above the region of interest;
- from the series of images, detecting, by a computer processor, at least one vehicle moving in the region of interest;
- for each image in the series of images, fitting, by the computer processor, a bounding box to the at least one moving vehicle, where the bounding box surrounds the at least one moving vehicle and the size of the bounding box is same across the series of images; and
- determining, by the computer processor, kinematic data for the at least one moving vehicle using the bounding boxes, where the kinematic data includes position for the at least one moving vehicle, velocity for the at least one moving vehicle, yaw angle for the at least one moving vehicle and yaw rate for the at least one moving vehicle.

2. The method of claim 1 further comprises capturing a series of images using an unmanned aerial vehicle, where the unmanned aerial vehicle is equipped with the camera.

3. The method of claim 1 wherein fitting the bounding box to the at least one moving vehicle includes overlaying a pre-defined image of a vehicle on a given detected vehicle; changing orientation of the pre-defined image in relation to the given detected vehicle; for each orientation, determining a correlation metric between the pre-defined image and the periphery of the given detected vehicle; and drawing a bounding box around the given detected vehicle based on the pre-defined image having the correlation metric with highest value.

4. The method of claim 1 wherein determining kinematic data for the at least one moving vehicle further comprises measuring the yaw angle for the at least one moving vehicle as an angle between a longitudinal axis of the bounding box surrounding the at least one moving vehicle and a reference axis of a coordinate system.

5. The method of claim 1 wherein determining kinematic data for the at least one moving vehicle further comprises determining a center point of the bounding boxes, calculating a distance between the center point of at least two of the bounding boxes and determining velocity of the at least one moving vehicle from the distance.

6. A method for extracting kinematic data for vehicles using an unmanned aerial vehicle, comprising:
- defining a region of interest on the ground;
- providing a background image of the region of interest;
- capturing, by a camera, a series of images over time of the region of interest from a perspective above the region of interest;
- from the series of images, detecting, by a computer processor, at least one vehicle moving in the region of interest by comparing each image in the series of images with the background image;
- for each image in the series of images, fitting, by the computer processor, a bounding box to the at least one moving vehicle, where the bounding box surrounds the at least one moving vehicle and the size of the bounding box is same across the series of images; and
- determining, by the computer processor, kinematic data for the at least one moving vehicle using the bounding boxes, where the kinematic data includes yaw angle for the at least one moving vehicle.

7. A method for detecting a vehicle passing through a region of interest, comprising:

capturing, by a top view camera, a first set of images of a region of interest on the ground from a perspective above the region of interest;

from the first set of images, creating a plurality of bounding boxes for each vehicle moving in the region of interest, and extracting kinematic data for each vehicle moving in the region of interest using the plurality of bounding boxes, where the kinematic data includes position for the at least one moving vehicle, velocity for the at least one moving vehicle, yaw angle for the at least one moving vehicle and yaw rate for the at least one moving vehicle;

capturing, by a side view camera, a second set of images of the region of interest from a perspective on side of the region of interest;

projecting the plurality of bounding boxes to viewpoint of the side view camera; and training a machine learning algorithm to detect moving vehicles in images captured by the side view camera, where the machine learning algorithm is trained using the second set of images and a ground truth, and the kinematic data and the plurality of bounding boxes projected to the viewpoint of the side view camera the serves as the ground truth.

8. The method of claim 7 further comprises capturing the first set of images using an unmanned aerial vehicle, where the unmanned aerial vehicle is equipped with the top view camera.

9. The method of claim 7 wherein creating a plurality of bounding boxes further comprises overlaying a pre-defined image of a vehicle on a given detected vehicle; changing orientation of the pre-defined image in relation to the given detected vehicle; for each orientation, determining a correlation metric between the pre-defined image and the periphery of the given detected vehicle; and drawing a bounding box around the given detected vehicle based on the pre-defined image having the correlation metric with highest value.

10. The method of claim 7 wherein extracting kinematic data for each moving vehicle further comprises measuring the yaw angle for a given moving vehicle as an angle between a longitudinal axis of the bounding box surrounding the given moving vehicle and a reference axis of a coordinate system.

11. The method of claim 7 wherein extracting kinematic data for each moving vehicle includes determining a center point of a given bounding box in the plurality of bounding boxes, calculating a distance between the center point of at least two of the plurality of bounding boxes and determining velocity of the moving vehicle from the distance.

12. The method of claim 7 further comprises projecting the plurality of bounding boxes to the viewpoint of the side view camera using homography.

* * * * *